Dec. 26, 1950

J. C. LEHMAN ET AL 2,535,542

PORTABLE FRUIT PICKING DEVICE

Filed Jan. 22, 1948

INVENTORS
JAMES CLAIR LEHMAN AND
MAURICE E. LEHMAN

ATTORNEYS

Patented Dec. 26, 1950

2,535,542

UNITED STATES PATENT OFFICE 2,535,542

PORTABLE FRUIT PICKING DEVICE

James Clair Lehman, Paradise, and Maurice E. Lehman, Bareville, Pa., assignor to Paul B. Mellinger, Willow Street, Pa.

Application January 22, 1948, Serial No. 3,676

4 Claims. (Cl. 56—330)

Our invention relates to fruit picking devices, and more particularly to a portable device for picking fruit from trees.

An important object of the invention is to provide a portable device for picking tree fruit such as apples, oranges or pears, which will eliminate most of the manual labor involved in hand-picking, and reduce to a minimum the number of workers required.

A further object of the invention is to provide a portable power-operated fruit picking device which is compact and light, so that it can be readily carried and manipulated over various parts of fruit trees.

A further object is to provide a portable fruit-picking device which is designed to pick tree fruit rapidly without injuring fruit or tree foliage.

A still further object of the invention is to provide a device of the above-mentioned character which is extremely simple, practical, and quite inexpensive to manufacture.

Other objects and advantages of the invention will be apparent during the course of the following description.

Figure 1:
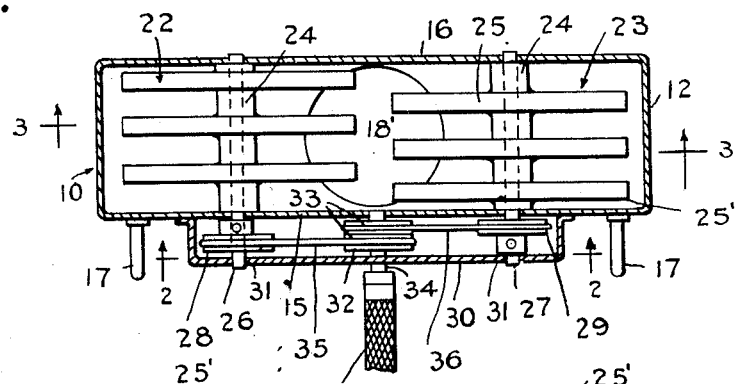
Figure 2:
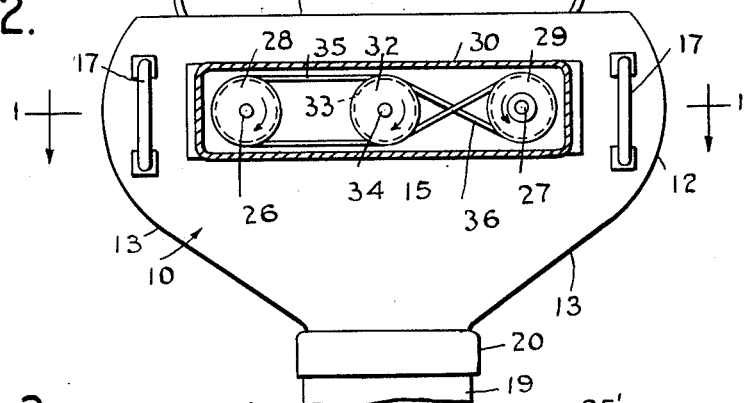
Figure 3:
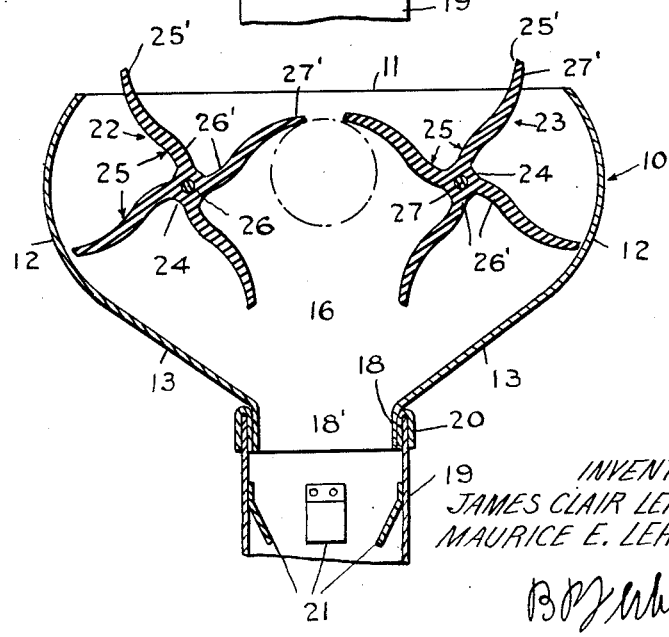

In the accompanying drawings forming a part of this application, and in which like numerals are employed to designate like parts throughout the same, Figure 1 is a horizontal section taken on line 1—1 of Figure 2, Figure 2 is a vertical section taken one line 2—2 of Figure 1, and, Figure 3 is a vertical section taken on line 3—3 of Figure 1.

In the drawings, where for the purpose of illustration is shown a preferred embodiment of the invention, the numeral 10 designates the hopper or casing of the portable fruit-picking device. This hopper 10 is elongated and rectangular in plan, and open at its top 11. The ends 12 of the casing 10 are curved and slope downwardly to form inclined converging flat bottom portions 13. The casing 10 further includes vertical flat sides 15 and 16 which are integral with the ends 12 and bottom portions 13. Adjacent to each end 12, the side 15 has rigidly secured to it a vertically disposed U-shaped handle 17, to facilitate carrying the fruit-picking device. A central depending annular sleeve 18 is formed integral with the sides 15 and 16, and inclined bottom portion 13, and this sleeve forms a central discharge opening 18' at the bottom of the hopper 10. The hopper may be formed of sheet metal or other suitable light durable material of sufficient rigidity.

A light, flexible discharge tube or chute 19 is provided, and this flexible tube is generally cylindrical and may be made in the desired length to convey the picked fruit to the desired point on the ground. The tube 19 is preferably formed of canvas or other suitable light, flexible material of sufficient strength. At its upper end, the tube 19 carries a rigid annular collar or ring 20, adapted to be pressed over the sleeve 18 for detachably connecting the tube 19 to the sleeve. The chute or tube 19 is provided upon its inside with a plurality of longitudinally spaced groups of annularly spaced resilient flaps or fins 21. These flaps 21 are inclined downwardly, and project inwardly radially from the wall of tube 19, as shown, and serve to retard the travel of the fruit through the tube and to prevent injury to the fruit. The flaps 21 are preferably made of soft rubber, or the like.

Rotatably mounted within the casing 10 are a pair of rotary fruit-picking elements or beaters 22 and 23. Each of the rotary picking elements comprises a cylindrical tubular hub 24, which extends from the inner face of side 15 to the inner face of side 16. Each hub 24 is preferably formed of hard rubber and is substantially rigid. Formed integral with each hub 24 are a plurality of axially-spaced groups of radial picking arms 25. The arms 25 of each group are preferably spaced equidistantly circumferentially about the hub 24, and are formed with a slight reverse curvature, as shown in Figure 3, so that the outer leading end 25' of each arm 25 projects forwardly in the direction of rotation of the picking element. The inner portions 26' of the arms 25, adjacent to hubs 24, are formed of hard rubber, but have a slight degree of resiliency. The outer portions 27' of the arms are formed of rubber which is relatively softer than the rubber used for the inner portions 26', and the outer portions of the arms have a higher degree of resiliency. Further, the outer portion of each arm 25 tapers slightly towards its outermost end so that the arm has increased resiliency or flexibility toward its outer end. The arms 25 possess the required degree of stiffness to perform their proper function without causing damage to the fruit or tree foliage. Each rubber arm 25 varies in composition throughout its length so that such arm gradually increases in resiliency toward its outer end.

The picking elements 22 and 23 are mounted upon transverse horizontal rotatable shafts 26 and 27, and rotate with these shafts. The shafts 26 and 27 are journalled in openings formed in the sides 15 and 16, as shown. The arrangement and spacing of the shafts 26 and 27 is such that the inner opposed ends of the arms 25 are spaced apart slightly, and the arms 25 of the elements 22 and 23 are arranged in staggered relation, as shown in Figure 1. The outer ends of arms 25 travel close to the ends 12 of casing 10, and the ends 25' extend slightly beyond the open top 11 as they rotate.

The shafts 26 and 27 extend through side 15 and have mounted upon them grooved pulleys 28 and 29, disposed exteriorly of casing 10. An outer rectangular guard or housing 30 is provided, and rigidly secured to the side 15. This housing 30 serves to inclose the pulleys 28 and 29, and is provided with openings 31 within which the outer ends of shafts 26 and 27 are journalled. Disposed at the longitudinal center of the housing 30 and casing 10, and inclosed within the housing 30 is a pulley 32, provided with a pair of annular grooves 33. The pulley 32 is mounted upon a short shaft 34 for rotation therewith, and the shaft 34 is journalled in openings in the side 15 and housing 30.

Belts 35 and 36 serve to operatively connect the pulleys 28 and 29 with the pulley 32. The belt 36 is crossed, as shown in Figure 2, so that the picker elements 22 and 23 will rotate in opposite directions. As viewed in Figure 3, the picker element 22 rotates clockwise, while the picker element 23 is rotating counterclockwise.

One end of the short shaft 34 projects outwardly from the housing 30, and is operatively connected with a flexible drive cable 37 which leads to any suitable source of power.

In operation, the user of the device grasps the handles 17 and may manipulate the hopper 10 into proper relation with the foliage of the tree containing the fruit. This may be done while the operator is standing on a suitable platform, vehicle or ladder. The rotary picking elements 22 and 23 are brought into engagement with the fruit to be picked, and such fruit is drawn into the hopper 10 by the arms 25 of the picking elements. As the fruit is forced downwardly in the hopper it becomes severed or pulled from the twigs which support it. The picked fruit may drop directly through the discharge opening 18', or roll down either of the inclined bottom portions 13 into the discharge opening. From the discharge opening 18' the picked fruit gravitates into the tube or chute 19, which is flexible, and may be directed to the desired receptacle on the ground. The resilient flaps 21 engage the picked fruit while it passes through the tube 19 and these flaps tend to retard the travel of the fruit, so that it will not be bruised or otherwise injured.

It is to be understood that the form of the invention herewith shown and described is to be taken as a preferred example of the same, and that various changes in the shape, size and arrangement of parts may be resorted to, without departing from the spirit of the invention, or the scope of the sub-joined claims.

Having thus described the invention, we claim:

1. A portable fruit picking device, comprising a receptacle, rotary picking elements mounted upon the receptacle and including generally radial arms, each arm tapering outwardly so that it has increased flexibility toward its outer end, and means for driving the rotary picking elements, the arm of one rotary picking element being in staggered relationship with the arms on the other rotary picking element, whereby they can freely rotate without contacting one another.

2. A portable fruit picking device, comprising a receptacle, rotary picking elements mounted upon the receptacle and including generally radial arms, each arm including an inner relatively stiff portion and an outer relatively resilient portion, and means for driving the rotary picking elements, the arms of one rotary picking element being in staggered relationship with the arms on the other rotary picking element, whereby they can freely rotate without contacting one another.

3. A portable fruit picking device, comprising a receptacle to receive the fruit and a discharge opening, rotary picking elements mounted upon the receptacle and including generally radial arms, each arm tapering outwardly so that it has increasing flexibility toward its outer end, and means for driving the rotary picking elements, the arms of one rotary picking element being in staggered relationship with the arms on the other rotary picking element, whereby they can freely rotate without contacting one another.

4. A portable fruit picking device, comprising a receptacle, rotary picking elements mounted upon the receptacle and including generally radial arms, each arm tapering outwardly so that it has increasing flexibility toward its outer end, and means for driving one of the rotary picking elements in a clockwise direction and the other in a counterclockwise direction, the arms of one rotary picking element being in staggered relationship with the arms on the other rotary picking element, whereby they can freely rotate without contacting one another.

JAMES CLAIR LEHMAN.
MAURICE E. LEHMAN.

REFERENCES CITED

The following references are of record in the file of this patent:

UNITED STATES PATENTS

| Number | Name | Date |
|---|---|---|
| 787,314 | Summerfield | Apr. 11, 1905 |
| 1,351,398 | Newman | Aug. 31, 1920 |